Jan. 17, 1939.  E. I. SCHWARZ  2,144,231
DIE FOR FASTENING SLEEVES ON CABLES OR RODS
Filed March 4, 1937   2 Sheets-Sheet 2

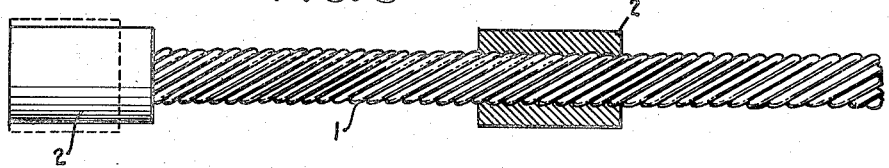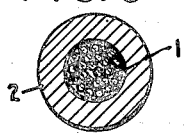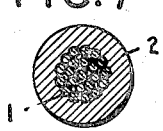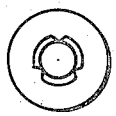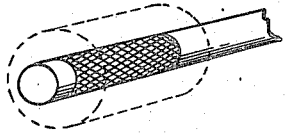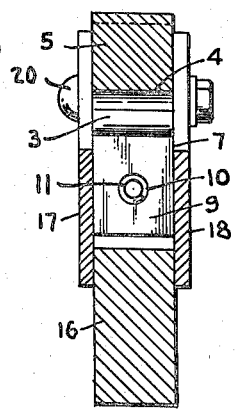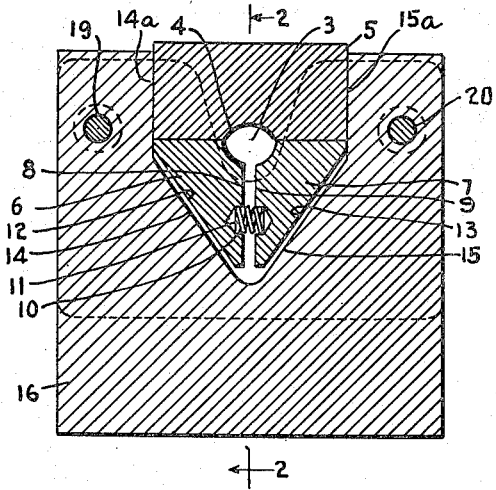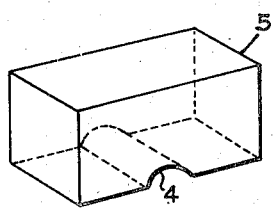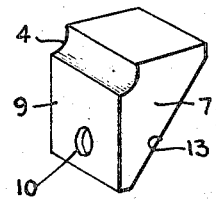
INVENTOR.
ERNEST I. SCHWARZ
BY Harry Lea Dodson
ATTORNEY.

INVENTOR.
ERNEST I. SCHWARZ
BY Harry Lea Dodson
ATTORNEY.

Patented Jan. 17, 1939

2,144,231

UNITED STATES PATENT OFFICE 2,144,231

DIE FOR FASTENING SLEEVES ON CABLES OR RODS

Ernest I. Schwarz, Bronx, N. Y.

Application March 4, 1937, Serial No. 128,916

3 Claims. (Cl. 140—113)

My invention relates more particularly to the cables used for automobile brakes; although it will be clear from the following description that it is equally available for fastening a hollow member on any kind of a solid member.

Cables on automobiles rust and break and have to be replaced with more or less frequency, but as they are subjected to great tensile strains it is vitally important that they hold. Therefore, it is usually the custom for them to be manufactured in the shop of the manufacturer. The result is, inasmuch as there are many different makes and models of cars, all with different length of cables, that the accessory dealer or the garage man must carry a very large stock in order to meet the demand.

My invention has for its object to provide a die for securing sleeves on a cable or stranded material which can be followed easily by any mechanic and the tools can be made very inexpensively.

My invention has for its further object to provide a set of dies which can be employed to secure a hollow member on a solid one, so that it will resist great tensile strains and also which can be fastened very conveniently and inexpensively.

My means of accomplishing the foregoing objects may be more fully comprehended by having reference to the accompanying drawings, which are hereunto annexed and are a part of this specification in which:

Fig. 1 is a vertical section of a die for securing the sleeve in place.

Fig. 2 is a section on the line 2—2 in Fig. 1.

Fig. 3 is a detail view of the upper die section.

Fig. 4 is a detail view of the lower die sections.

Fig. 5 is a side view of a cable having a sleeve secured to one end and another sleeve in section, the dotted lines on the end showing the sleeve before it is secured.

Fig. 6 is a cross section of the cable and sleeve before assembly.

Fig. 7 is a cross section of the cable and sleeve after assembly.

Fig. 8 is a phantom view of a sleeve mounted on a rod.

Fig. 9 is a modified form of a way of roughening the abutting surfaces of a sleeve before assembling on a rod.

Fig. 10 is a cross section of modified form shown in Fig. 9 after assembled on rod.

Similar reference numerals refer to similar parts throughout the entire specification.

Figure 12:
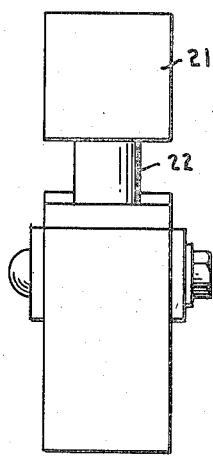
Fig. 12 is an end view of the same.
Figure 11:
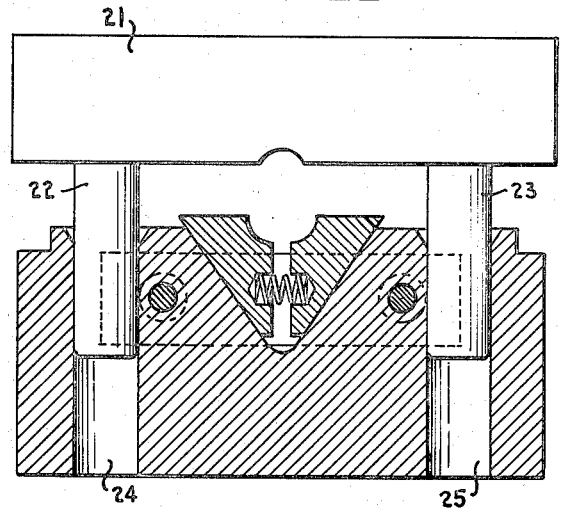
Fig. 11 is a vertical sectional view of a modified form of die.
Figure 13:
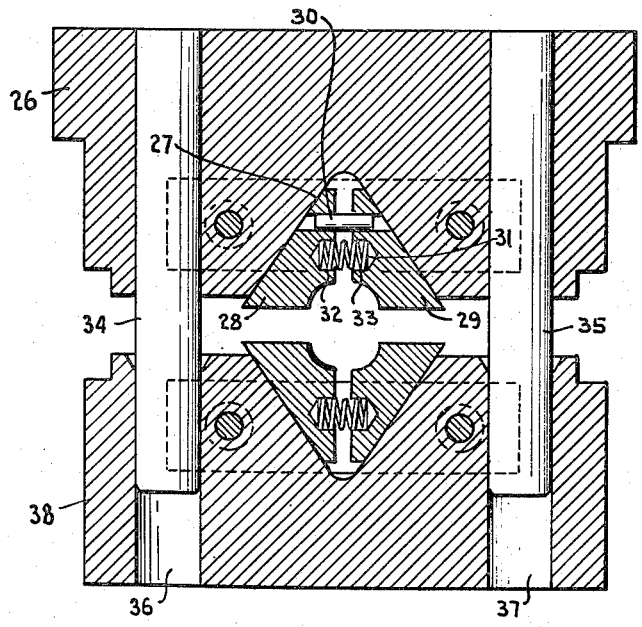
Fig. 13 is a vertical sectional view of another form of die to be used in employing my improved method of securing a hollow member upon a solid one which may be stranded or not as required.

As shown in Figs. 1, 2 and 5 of the drawings, the cable 1 is inserted into a sleeve 2. The sleeve and cable is then inserted into a transverse circular aperture 3 formed by uniting the arcuate portions 4 of the die sections. As shown in these views, the die is formed in three sections, an upper section 5 and two mating sections 6 and 7. These sections 5, 6 and 7 are more clearly shown in the perspective views, Fig. 3 and Fig. 4. The sections 6 and 7 are triangular in shape having abutting vertical surfaces 8 and 9. A hole 10 is formed in these surfaces 8 and 9 in which is mounted a coil spring 11, the tension of which serves to hold the sections spaced as clearly seen in Fig. 1. The sides 12 and 13 slide upon inclined surfaces 14 and 15 formed in the die block 16. The upper section 5 is guided in its vertical movement by sides 14a and 15a respectively. Plates 17 and 18 are secured to the sides of the die block 16 to hold the sections in place, as shown they are secured by means of bolts 19 and 20. As shown in Fig. 11 and Fig. 12, the upper section 21 is provided with vertical guide posts 22 and 23 which slide in vertical sockets 24 and 25. In some cases it may be found desirable to construct the die as shown in Fig. 13 in which case the upper die block 26 is formed with a triangular recess 27 into which two sections 28 and 29 corresponding to the sections 6 and 7 are inserted. In such construction, a horizontal pin 30 is fitted in the sections 28 and 29 to hold them in register. A coil spring 31 corresponding in shape and function to the spring 11 is mounted in holes 32 and 33 formed in the sections 28 and 29. Guide posts 34 and 35 are provided for the die block 26 to keep same in register with the lower die block, and slide in sockets 36 and 37 formed in the lower die block 38. Both the upper and lower die blocks are held in place by side plates.

In carrying out my method, the cable 1 is inserted into the sleeve 2 which is of varying hardness from the cable. They are then placed in the circular recess formed by the arcuate portions 4 of the die sections. Pressure is then applied by means of any standard punch or forcing press (not shown) and inasmuch as the diameter of the circular recess formed by the arcuate portions 4 is of smaller diameter than the sleeve 2, the pressure forces the excess metal into the interstices between the strands of the cable and binds the sleeve so firmly upon the cable that it will not let go even when subjected to a considerable excess of the greatest tensile strain it will have to support in usage.

In fastening a hollow member upon a solid rod, the abutting surface of the rod may be roughened by a knurl as shown in Fig. 8 or the inner surface of the sleeve may be broached out as shown in Fig. 9 and Fig. 10. It will be apparent to those skilled in the art that the sleeve and the member upon which it is to be mounted must be of varying hardness. Preferably the sleeve should be the softer.

Although I have illustrated specific forms of dies, it will be obvious that the invention is not confined to any specific type of die and I do not desire to be understood as limiting myself to any specific type shown except as may appear in the hereinafter contained claims.

Having described my invention, what I regard as new and desire to secure by Letters Patent is:

1. A die for compressing a sleeve upon a cable or rod comprising, a die block having a recess therein with inclined sides, a pair of mating die sections having inclined sides mounted to slide on said inclined sides of said block, there being transverse arcuate surfaces on said sections, means to hold said sections normally spaced from each other, an upper die section having a transverse arcuate surface adapted to cooperate with the other die sections to form a complete circular opening of smaller diameter than the outside diameter of the sleeve when said die sections abut, whereby when the sleeve with inserted cable is placed in said transverse opening and pressure is applied, the excess metal will be forced into the interstices intermediate the strands of the cable.

2. A die for compressing a sleeve upon a cable or rod comprising a sectional die mounted in die blocks said sections having cooperating transverse arcuate surfaces which when the sections abut form a complete circular opening of smaller diameter than the sleeve two or more sections having tapered sides, means to hold said tapered sections normally spaced apart, means in said die blocks to cause said sections to abut upon vertical movement of the said dies, and means to guide said die blocks.

3. A die for compressing a sleeve upon a cable or rod comprising a die block having a recess therein with inclined sides, a pair of mating die sections having inclined sides mounted to slide on said inclined sides of said die block, there being transverse arcuate surfaces on said sections, means to hold said sections normally spaced from each other, an upper die section, guides for said die block, said die having a transverse arcuate surface adapted to cooperate with the other arcuate surfaces to form a complete circular opening of smaller diameter than the outside diameter of the sleeve when said die sections abut whereby when the sleeve with inserted cable is placed in said transverse opening and pressure is applied, the excess metal will be forced into the interstices intermediate the strands of the cable.

ERNEST I. SCHWARZ.